Sept. 21, 1943.   M. F. THOMAS   2,329,864
LIGHT PROJECTOR FOR GUN SIGHTS
Filed Aug. 25, 1942
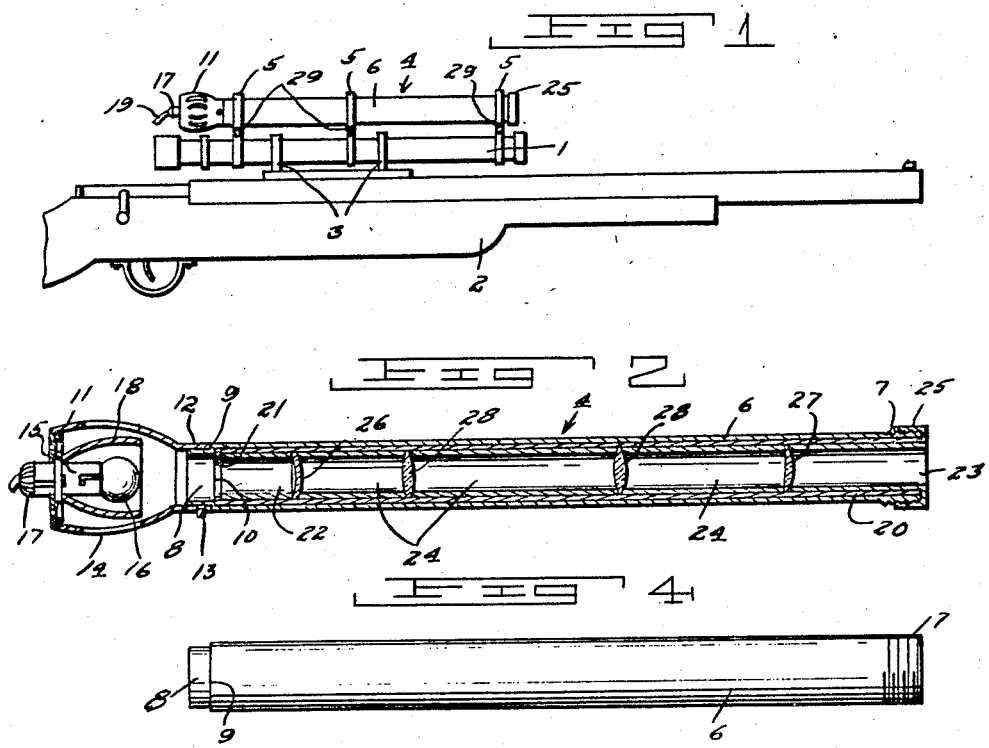
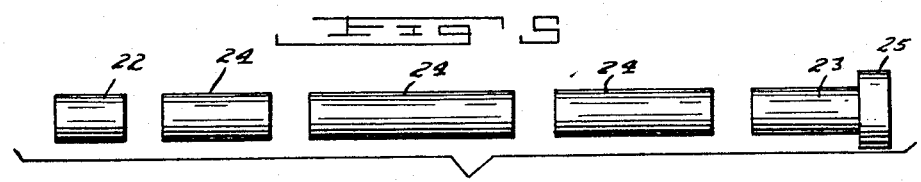
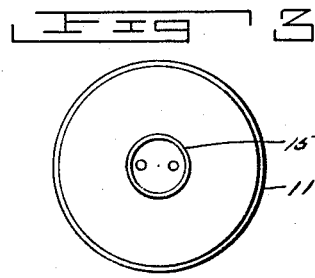
Inventor
Michael F. Thomas
By Clarence A. O'Brien
and Harvey B. Jacobson
Attorneys

UNITED STATES PATENT OFFICE 2,329,864

LIGHT PROJECTOR FOR GUN SIGHTS

Michael F. Thomas, Stephenson, Mich.

Application August 25, 1942, Serial No. 456,067

1 Claim. (Cl. 240—6.41)

My invention relates to improvements in light projectors for telescopic gun sights, the principal object in view being to provide a simply constructed device of this character which may be readily attached to the conventional telescopic gun sight and which is especially adapted to project a pencil-type beam for a long distance to enable spotting remote targets at night for accurate aiming and night firing.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in side elevation illustrating a telescopic gun sight equipped with my improved light projector, Figure 2 is a view in longitudinal section of the light projector drawn to an enlarged scale, Figure 3 is a view in rear elevation drawn to a further enlarged scale, Figure 4 is a view in side elevation of the outer casing section, and Figure 5 is a disassembled view of the spacing sections shown in side elevation.

Referring to the drawing by numerals, my improved light projector has been shown therein as applied to a conventionally illustrated telescopic gun sight 1 mounted on a rifle 2 above the barrel by means of a bracket 3, the light projector designated by the numeral 4 being mounted on the sight 1 parallel therewith and above the same by suitable clamps 5.

According to my invention, a light projector 4 is provided comprising as its basic element a tubular outer casing 6 of any suitable length, said casing having an externally threaded front end 7, and a reduced rear end 8 forming an external annular shoulder 9 and an internal annular shoulder 10.

At the rear end of the outer casing 6 is a rearwardly flaring cage 11 having a reduced front end 12 sleeved onto the reduced end 8 and retained thereon, as by a set screw 13. Spaced around the cage 11 are suitable slots 14 for venting hot air from the cage.

Suitably mounted in the rear end of the cage 11 in the axis of the outer casing 6 is an electric light socket 15 extending rearwardly out of said cage 11 and having suitably fixed in its front end an electric light 16. The rear end of the socket 15 is equipped with a suitable type of rotary switch plug 17 for the attachment of leads, as at 19, thereto extending from a source of electric power, such as a battery, not shown.

The socket 15 has suitably mounted thereon within the cage 11 a parabolic-type, highly polished reflector 18 surrounding the light 16 and extending forwardly of the slots 14.

Slidably fitted in the outer casing 6 is an inner tubular casing 20 extending between the internal shoulder 10 and the front end of the outer casing 6 and having a rear end internal flange 21 fitting against said internal shoulder 10.

The inner casing 20 is designed to contain a series of rear, front, and intermediate spacing sleeves 22, 23, 24 of tubular form and different lengths, relatively, and having highly polished internal reflecting bores for intensifying illumination for a purpose presently seen. The front sleeve 23 is provided with an annular cap forming flange 25 internally threaded for turning onto the front end 7 of the outer casing 6 whereby the inner casing 20 is secured in the outer casing 6 and said sleeves 22, 23, 24 are secured in said inner casing 20.

A series of rear, front, and intermediate lenses 26, 27, 28 are clamped by and between the sleeves 22, 23, 24, the rear and intermediate lenses being of a suitable type to magnify, for instance double convex, and project the light rays from the electric light 16 forwardly and the front lens 27 being of a suitable type, for instance plano-convex, for condensing and focusing the light rays to project a pencil-like beam out of the front sleeve 23.

As will be seen, since the rear sleeve 22 abuts the flange 21 of the inner casing 20, the lenses may be tightly clamped in space relation by turning the front sleeve 23 into the inner casing 20 by means of the flange 25. Also, the inner casing 20 forms a carrier for the described sleeves and lenses so that these parts may be removed from the outer casing 6, and put back into the outer casing 6 as a unitary assembly in disassembling and assembling the parts of the projector.

The beforementioned clamps 5 are of a suitable type for gripping, frictionally, the telescopic sight 1 so that the light projector may be swung around said sight to either side thereof in an out-of-the-way position.

The foregoing will, it is believed, suffice to impart a clear understanding of my invention, since the operation thereof will be obvious from the description of parts.

Manifestly, the invention, as described, is susceptible of modification without departing from the inventive concept, and right is herein reserved to such modifications as fall within the scope of the appended claim.

What I claim is:

A light projecting device for mounting on a telescopic gun sight comprising an outer tubular casing having a reduced rear end forming an external shoulder on said casing and an internal shoulder therein, a flaring cage sleeved on to said reduced end of said casing against the external shoulder, an electric light in said cage in the axis of the casing, a reflector in said cage surrounding said light for directing light rays therefrom forwardly, a plurality of lenses, and means to mount said lenses in said outer casing in longitudinally spaced relation therein comprising an inner tubular casing slidably fitting in the outer casing against said internal shoulder and extending substantially to the front end of the outer casing, said inner casing having an internal rear end annular flange, and a plurality of tubular sleeves fitting in said inner casing and clamping the lenses between ends thereof, one of said sleeves abutting said flange and another of said sleeves having an annular top fitted on to the front end of the outer casing to retain the inner casing in the outer one and the sleeves in the inner casing.

MICHAEL F. THOMAS.